(12) United States Patent
Oda et al.

(10) Patent No.: US 8,802,242 B2
(45) Date of Patent: Aug. 12, 2014

(54) CLAD PLATE

(75) Inventors: Yoshimitsu Oda, Suita (JP); Masaaki Ishio, Osaka (JP); Toshiaki Fujita, Hirakata (JP)

(73) Assignee: Neomax Materials Co., Ltd., Osaka (JP)

( * ) Notice: Subject to any disclaimer, the term of this patent is extended or adjusted under 35 U.S.C. 154(b) by 40 days.

(21) Appl. No.: 13/266,817

(22) PCT Filed: Jan. 8, 2010

(86) PCT No.: PCT/JP2010/050144
§ 371 (c)(1),
(2), (4) Date: Oct. 28, 2011

(87) PCT Pub. No.: WO2010/137353
PCT Pub. Date: Dec. 2, 2010

(65) Prior Publication Data
US 2012/0058360 A1  Mar. 8, 2012

(30) Foreign Application Priority Data

May 29, 2009 (JP) ................................. 2009-129836

(51) Int. Cl.
| | |
|---|---|
| *B23K 20/02* | (2006.01) |
| *B23K 35/30* | (2006.01) |
| *C22C 21/06* | (2006.01) |
| *B32B 15/01* | (2006.01) |
| *C22C 9/00* | (2006.01) |
| *H01M 2/30* | (2006.01) |
| *C22C 21/12* | (2006.01) |
| *C22C 21/02* | (2006.01) |
| *C22C 21/00* | (2006.01) |
| *B23K 33/00* | (2006.01) |
| *C22C 9/04* | (2006.01) |
| *C22C 19/00* | (2006.01) |
| *C22C 9/06* | (2006.01) |
| *C22C 38/00* | (2006.01) |
| *C22C 21/16* | (2006.01) |
| *C22C 19/03* | (2006.01) |

(52) U.S. Cl.
CPC .......... *H01M 2/305* (2013.01); *B23K 35/3033* (2013.01); *C22C 21/06* (2013.01); *B32B 15/012* (2013.01); *C22C 9/00* (2013.01); *C22C 21/12* (2013.01); *C22C 21/02* (2013.01); *C22C 21/00* (2013.01); *Y02E 60/12* (2013.01); *B32B 15/015* (2013.01); *B23K 20/02* (2013.01); *B32B 15/017* (2013.01); *B23K 33/004* (2013.01); *B23K 2203/18* (2013.01); *C22C 9/04* (2013.01); *C22C 19/002* (2013.01); *C22C 9/06* (2013.01); *C22C 38/00* (2013.01); *C22C 21/16* (2013.01); *C22C 19/03* (2013.01)
USPC ........................................... 428/653; 428/650

(58) Field of Classification Search
USPC ................... 228/249, 250, 251–253
See application file for complete search history.

(56) References Cited

U.S. PATENT DOCUMENTS 3,427,707 A * 2/1969 Nowosadko .................. 228/154

FOREIGN PATENT DOCUMENTS

| JP | 02-121786 A | 5/1990 |
|---|---|---|
| JP | 03-128180 A | 5/1991 |
| JP | 05-200566 A | 8/1993 |
| JP | 09-206801 A | 8/1997 |
| JP | 09-327703 A | 12/1997 |
| JP | 11-156995 A | 6/1999 |
| JP | 2008-006496 A | 1/2008 |

OTHER PUBLICATIONS

English Machine Translation of JP 11-156995, translated on Dec. 14, 2012.*
English Machine Translation of JP 2008-006496, translated on Dec. 14, 2012.*
Official Communication issued in International Patent Application No. PCT/JP2010/050144, mailed on Apr. 13, 2010.

* cited by examiner

*Primary Examiner* — Adam Krupicka
(74) *Attorney, Agent, or Firm* — Keating & Bennett, LLP

(57) ABSTRACT

A clad plate includes an aluminum plate and a hard metal plate joined together at side end surfaces thereof. Side end surfaces of an aluminum plate and a hard metal plate are jointed together via a nickel layer by pressure welding. A ridge and a groove formed in the side end surface of the aluminum plate are respectively engaged and joined, via the nickel layer, to a groove and a ridge formed in the side end surface of the hard metal plate, and an end portion of the nickel layer extends beyond the rear end portion of the side end surface of the aluminum plate and is jointed to the plate surface of the aluminum plate with the end portion exposed thereon. The average width W of the exposed portion of the nickel layer exposed on the plate surface is preferably from about 0.2 mm to about 1.5 mm.

14 Claims, 2 Drawing Sheets

CLAD PLATE

BACKGROUND OF THE INVENTION

1. Field of the Invention

The present invention relates to a clad plate (referred to below as a "parallelly joined clad plate") that joins together an aluminum plate made of an aluminum material and a hard metal plate made of a copper material, or other suitable material, at the respective side end surfaces (end surfaces in the width direction) thereof.

2. Description of the Related Art

In lithium ion battery packs that are installed in hybrid vehicles and in various types of electronic devices, lithium ion batteries are connected in series as needed, and these groups of serially connected batteries are connected in parallel. For this reason, many wiring materials have been used for connecting the batteries. Lithium ion batteries have positive terminals that are made from an aluminum material and negative terminals that are mainly made from a copper material. For this reason, wiring material for connecting positive terminals and negative terminals in series is preferably a composite metal material, with one end made of an aluminum material and the other end made of a metal material having good electrical conductivity, such as a copper material.

The inventors of the present invention have previously offered a parallelly joined clad plate suitable for this type of composite metal material in Japanese Laid-open Patent Publication No. 2008-6496. This parallelly joined clad plate is joined by pressure welding at the respective side end surfaces of a first metal plate made of an aluminum material and a second metal plate made of a metal material such as copper material. A ridge and a groove are formed from the front end side to the rear end side of the side surface of the first metal plate, a ridge and a groove are also formed from the front end side to the rear end side of the side surface of the second metal plate, and the side end surfaces are jointed together in a condition in which the ridge of the first metal plate is engaged to the groove of the second metal plate, and the groove of the first metal plate is engaged to the ridge of the second metal plate, respectively. In this parallelly joined clad plate, joined surfaces (side end surfaces) are jointed together by pressure welding, with the ridges and grooves being engaged each other. Accordingly, good joining is produced.

In the case of wiring materials for electronic components and battery packs installed in vehicles, electric tools and the like, durability and reliability are recently desired in service environments that are extreme in terms of vibration and shock. Moreover, battery connection configurations are becoming more complicated, and there are situations in which wiring materials must be worked by bending, so that separation-resistant characteristics against bending are also desired.

On the other hand, a clad plate produced by pressure welding and diffusion joining of an aluminum plate and a copper plate along the plate surfaces thereof has been proposed in Japanese Laid-open Patent Publication No. 11-156995. In this clad plate, the aluminum plate and the copper plate are joined in an integral manner via a nickel layer to improve the joint strength between the aluminum plate and the copper plate.

The inventors of the present invention, in order to additionally improve the joint strength between the joined surfaces in a parallelly joined clad plate joined by the pressure welding of an aluminum plate and a copper plate at the respective side end surfaces thereof, produced a parallelly joined clad material in which the side end surface of an aluminum plate and the side end surface of a copper plate are joined together by pressure welding and diffusion joining with a nickel layer provided therebetween. It was confirmed that the joint strength of the parallelly joined clad plate is increased by providing the nickel layer. However, the front end portion of the side end surface of the copper plate and the nickel layer adjacent thereto is not sufficiently press-welded to the rear end portion of the side end surface of the aluminum plate, so that sufficient joint strength is not obtained. As a result, when the parallelly joined clad plate has been worked by bending, with the front end portion of the copper plate positioned towards the outside of the bend section, there is a tendency for the front end portion of the copper plate and the nickel layer adjacent thereto to undesirably peel off from the rear end portion of the aluminum plate.

SUMMARY OF THE INVENTION

To overcome the above problems, preferred embodiments of the present invention provide a parallelly joined clad plate having superior joint strength and separation-resistant characteristics against bending (referred to as "flexural separation-resistant characteristics") and in which an aluminum plate and a metal plate that is rigid or hard compared to the aluminum plate, such as a copper plate, are joined together at the respective side end surfaces thereof.

The inventors of the present invention produced a parallelly joined clad plate in which an aluminum plate and a copper or iron plate (both referred to below as "hard metal plate") are joined together by pressure welding and diffusion joining at their side end surfaces with a nickel layer interposed therebetween. The clad plate was bent with the joint section thereof centered on a bend and was closely observed regarding the condition in which peeling occurred at the bend section. As a result, the following was learned. The aluminum plate is soft in comparison with the hard metal plate and the nickel layer, and thus is plastically deformed easily. For this reason, when the aluminum plate and the hard metal plate are pressure-welded at the side end surfaces thereof in a condition in which the ridge and the groove formed in the side end surface of the aluminum plate are respectively engaged with the groove and the ridge formed in the side end surface of the hard metal plate via the nickel layer, the rear end portion of the side end surface of the aluminum plate plastically deforms the front end portion of the side end surface of the hard metal plate and the nickel layer adjacent thereto when pressed against the rear end portion of the aluminum plate. It will therefore be difficult to exert downward pressure on the front end portion of the side end surface of the hard metal plate and the adjacent nickel layer. As a result, sufficient pressure welding will not occur in those portions. For this reason, the front end portion of the hard metal plate and the adjacent nickel layer tend to peel off from the rear end portion of the aluminum plate and the flexural separation-resistant characteristics decrease. The preferred embodiments of the present invention were developed in light of this discovery.

Specifically, the parallelly joined clad plate of preferred embodiments of the present invention includes an aluminum plate made of an aluminum material and a hard metal plate made of a copper material or an iron material, a side end surface of the aluminum plate and a side end surface of the hard metal plate being joined together by pressure welding via a nickel layer. The side end surfaces are joined in a condition in which a ridge and a groove extending from the front end side to the rear end side in the side end surface of the aluminum plate are respectively engaged and joined, via the nickel layer, to a groove and a ridge extending from the rear end side to the front end side in the side end surface of the hard metal plate, and in which an end portion of the nickel layer is jointed to the plate surface of the aluminum plate, extending beyond the rear end portion of the side end surface of the aluminum plate and exposed on the plate surface thereof, and the average width of the exposed portion of the nickel layer exposed on the plate surface preferably being in the range from about 0.2 mm to about 1.5 mm, for example.

According to this parallelly joined clad plate, the ridge and the groove of the aluminum plate are respectively engaged and jointed to the groove and the ridge of the hard metal plate with the nickel layer interposed between the respective side end surfaces of the aluminum plate and hard metal plate, so that the aluminum plate and the hard metal plate are strongly jointed via the nickel layer at the side end surfaces thereof. In addition, the end portion of the nickel layer that extends beyond the rear end portion (refer to reference symbol B in FIG. 1) of the side end surface of the aluminum plate is jointed to the plate surface of the aluminum plate and the average width of the exposed portion (refer to reference symbol 4 in FIG. 1) of the nickel layer exposed on the plate surface is preferably in the range from about 0.2 mm to about 1.5 mm, for example, so that the front end portion (refer to reference symbol F in FIG. 1) of the side end surface of the hard metal plate is firmly joined to the nickel layer and the nickel layer of which the end portion is overlaid on the plate surface beyond the rear end portion of the aluminum plate is also firmly jointed to the aluminum plate. For this reason, even when the parallelly joined clad plate is bent so that the front end portion of the hard metal plate is on the outside of the bend section, the front end portion of the hard metal plate will not readily peel off from the rear end portion of the aluminum plate, and excellent flexural separation-resistant characteristics are achieved.

In the parallelly joined clad plate, the side end surface of the aluminum plate and the side end surface of the hard metal plate are preferably joined together by pressure welding and diffusion joining via a nickel layer. And pure aluminum or an aluminum alloy having an electrical conductivity of about 10% IACS or greater is preferred as the aluminum material from the viewpoint of electrical conductivity. And the copper material is preferably pure copper or copper alloy having an electrical conductivity of about 10% IACS or greater, and the iron material is preferably pure iron or mild steel. Iron material has poor electrical conductivity in comparison with copper material, but the iron material has high strength and is superior from an economic standpoint because of low costs.

In addition, the aluminum plate and hard metal plate each preferably have a plate thickness of about 0.5 mm to about 2 mm, for example, from the standpoint of use as wiring material for batteries, and it is preferable for both plates to have equal or substantially equal plate thickness. And the nickel layer preferably has an average thickness of about 30 μm to about 100 μm, for example.

As described above, in accordance with the parallelly joined clad plate of the preferred embodiments of the present invention, the side end surface of the aluminum plate and the side end surface of the hard metal plate formed from a copper plate or an iron plate are jointed together by pressure welding via a nickel layer with ridges and grooves engaged each other. The joint strength is therefore improved at the side end surfaces of the two plates. Moreover, the end portion of the nickel layer that extends beyond the rear end portion of the side end surface of the aluminum plate is jointed to the plate surface of the aluminum plate in a overlapped manner and the average width of the exposed portion of the nickel layer exposed on the plate surface is preferably in the range from about 0.2 mm to about 1.5 mm, for example. Consequently, even if bending occurs so that the front end portion of the side end surface of the hard metal plate is on the outside of the bend section, the front end portion of the hard metal plate will not readily peel off from the rear end portion of the aluminum plate, and superior flexural separation-resistant characteristics are achieved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
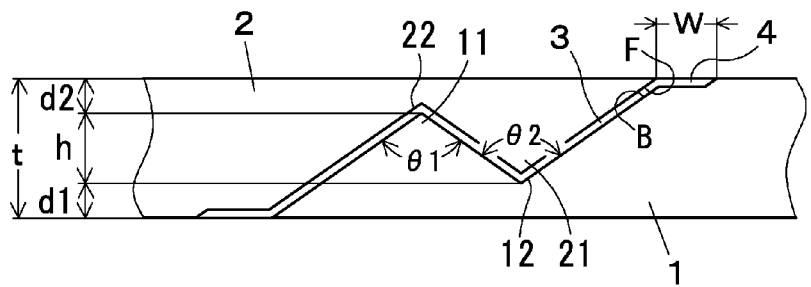
FIG. 1 is a cross-sectional view of the joint section in the width direction of the parallelly joined clad plate according to a preferred embodiment of the present invention.
Figure 2:
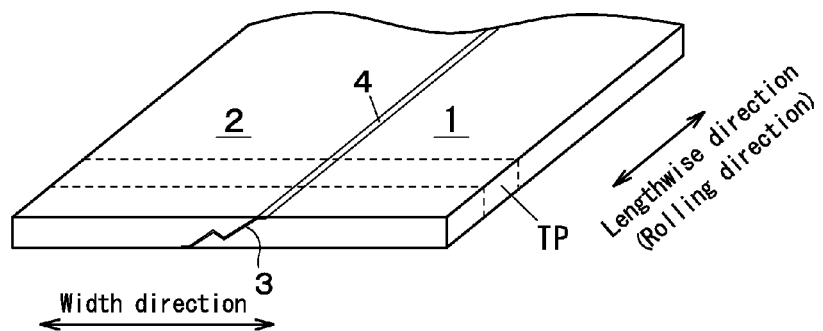
FIG. 2 is a partial oblique perspective view of the parallelly joined clad plate according to a preferred embodiment of the present invention.

The parallelly joined clad plate according to preferred embodiments of the present invention is described below in reference to the drawings. As shown in FIGS. 1 and 2, the parallelly joined clad plate according to a preferred embodiment includes an aluminum plate 1 made of an aluminum material and a hard metal plate 2 made of a copper material or iron material, and the side end surface of the aluminum plate 1 and the side end surface of the hard metal plate 2 are joined by pressure welding and diffusion joining with a nickel layer 3 interposed between the side end surfaces.

A groove 12 in the form of a concavity and a ridge 11 in the form of a convexity are defined by two slanted surfaces in the side end surface of the aluminum plate 1 from the rear end portion B to the front end portion of the side end surface thereof. The ridge 11 and the groove 12 are preferably formed so as to have the same cross-sectional shape along the lengthwise direction (refer to FIG. 2) of the aluminum plate 1. A ridge 21 in the form of a convexity and a groove 22 in the form of a concavity are also preferably provided in the side end surface of the hard metal plate 2 from two slanted surfaces from the front end portion F to the rear end portion of the side end surface thereof for the ridge 21 and the groove 22 to engage respectively to the groove 12 and the ridge 11 of the aluminum plate 1. And the side end surfaces are joined together in a condition in which the ridge 11 and the groove 12 provided in the side end surface of the aluminum plate 1 engage respectively to the groove 22 and the ridge 21 provided in the side end surface of the hard metal plate 2 via the nickel layer 3.

The angle $\theta_1$ (i.e., the angle of each of the ridge 11 and the groove 22) is defined by the adjacent slanted surfaces that define the ridge 11 of the aluminum plate 1 and the groove 22 of the hard metal plate 2, and the angle $\theta_2$ (i.e., the angle of each of the ridge 21 and the groove 12) is defined by the adjacent slanted surfaces that form the ridge 21 of the hard metal plate 2 and the groove 12 of the aluminum plate 1. The angles $\theta_1$ and $\theta_2$ preferably are each about 60° to about 150° and normally are equal or substantially equal to each other. In addition, where t is the plate thickness of the parallelly joined clad plate, d1 is the distance between the bottom of the groove 12 of the aluminum plate 1 and the bottom plate surface, d2 is the distance between the peak of the ridge 11 and the upper plate surface, and h is the distance between the peak of the ridge 11 and the bottom of the groove 12, h is set from about (t/3−t/10) to about (t/3+t/10), and d1 and d2 are set to be equal or approximately equal to each other, for example. The plate thickness of the parallelly joined clad plate is determined in accordance with necessity, but when the parallelly joined clad plate is an electroconductive material such as a wiring connection material to connect the electrodes of a battery, the thickness preferably is normally about 0.5 mm to about 2 mm, for example.

When the parallelly joined clad plate is to be an electroconductive material, the aluminum material that forms the aluminum plate 1 is preferably pure Al or an Al alloy having an electrical conductivity of about 10% IACS or greater, preferably about 20% IACS or greater, for example. The term "% IACS" (international annealed copper standard) meaning electrical conductivity is expressed below simply as "%." The electrical conductivity (% IACS) of a given material is calculated using the formula below, where, for example, pure Cu is 100% and pure Al is 65%.

Electrical conductivity (% IACS)=Volume resistivity
(1.7241 μΩ·cm) of standard soft copper (pure
copper)/Volume resistivity of given material×100

Electrical conductivity increases according to increasing Al content and hence an Al alloy having an Al content of about 90 mass % (abbreviated as "%" below) or greater, more preferably about 95% or greater is preferred as the Al alloy having an electrical conductivity of about 10% or greater, for example. Specifically, the Al alloys specified in JIS 1050, 1060, 1070, 1080, 1100, 1200, 3003, 5005, 6063, and 6101 are cited as examples. For example, the 5005 alloy referred to above is an Al—(0.5-1.1%)Mn solid-solution strengthened alloy having an electrical conductivity of about 52%. Exemplified as other suitable Al alloys are Al—(4-5%)Mg alloy (JIS A5082, electrical conductivity: about 29%), Al—(5-6%)Cu alloy (JIS A2011, electrical conductivity: about 39%), Al—(3.5-4.5%)Cu—(0.4-1.0%)Mn—(0.2-0.8%)Mg alloy (JIS A2017, Duralumin, electrical conductivity: about 50%), Al—(3.8-4.9%)Cu—(0.3-0.9%)Mn—(1.2-1.8%)Mg alloy (JIS A2024, Super Duralumin, electrical conductivity: about 30%), and Al—(11-13.5%)Si—(0.8-1.3%)Mg alloy (JIS A4032, electrical conductivity: about 40%). These Al alloys are useful for pressure welding of the hard metal plate and nickel layer, because they are harder than pure Al, which is the poorest for pressure welding.

When the parallelly joined clad plate is to be used as an electroconductive material, the copper material for the hard metal plate 2 is preferably pure Cu or a Cu alloy having an electrical conductivity of about 10% or greater, preferably about 20% or greater, for example. A Cu alloy has higher electrical conductivity according to increasing Cu content and hence it is preferable to use a Cu alloy having a Cu content of about 90% or greater, more preferably about 95% or greater, for example. Examples of this type of Cu alloy include the Cu alloys specified in JIS C1020, C1100, C1201, and C14500, or the Cu—Be alloys and Cu—Cr alloys specified in JIS 23234. The following are examples of other Cu alloys that may be utilized: are Cu—2% Ni alloy (electrical conductivity: about 33%), Cu—6% Ni alloy (electrical conductivity: about 17%), Cu—9.5% Ni alloy (electrical conductivity: about 11%), Cu—30% Zn alloy (electrical conductivity: about 27.4%), Cu—34% Zn alloy (electrical conductivity: about 26.5%), Cu—Fe—P (Fe+P: 0.13%) alloy (electrical conductivity: about 93%), Cu—Fe—P (Fe+P: 2.48%) alloy (electrical conductivity: about 69%), and Cu—0.2% Zr alloy (electrical conductivity: about 93%).

In addition, when the parallelly joined clad plate is to be used as an electroconductive material, the iron for the hard metal plate 2 is preferably pure Fe (electrical conductivity: about 13%) or a Fe alloy having an electrical conductivity of about 10% or greater, for example. Examples of such Fe alloys include mild steel having a carbon content of about 0.2% or less.

The material for the nickel layer 3 is preferably pure Ni or a Ni alloy containing about 90% or greater of Ni as the primary component, for example. These nickel-based metals have comparatively high electrical conductivity and excellent bondability with aluminum material, copper material, and iron material. The Ni alloy has higher electrical conductivity with increased Ni content, so that it is preferable for the Ni content to be about 95% or greater, for example. A suitable Ni alloy is, for example, Ni—(2% or less) Cu alloy (electrical conductivity: about 16.7% or greater).

The average thickness of the nickel layer 3 is normally about 20 μm to about 150 μm, and preferably about 30 μm to about 120 μm, for example, from the viewpoints of easy handling of the material during production and of material costs. Where t is the thickness of the clad plate, the average thickness is calculated by taking the arithmetic mean of the thicknesses at locations of t/4 from the upper and lower surfaces and of t/2.

As shown in FIG. 1, one end portion of the nickel layer is jointed to the plate surface of the aluminum plate, extending beyond the rear end portion (shoulder portion) B of the side end surface of the aluminum plate 1 and exposed on the plate surface, and the width W of the exposed portion 4 that is exposed on the plate surface is preferably in the range from about 0.2 mm to about 1.5 mm, for example, on the average in the lengthwise direction. As will be made clear from the description of the examples below, if the average width of the exposed portion 4 is less than about 0.2 mm, the overlap on the plate surface beyond the rear end portion B becomes too small, and the flexural separation-resistant characteristics decrease. On the other hand, if the average width of the exposed portion 4 exceeds about 1.5 mm, then it will become difficult to press down the exposed portion of the nickel layer 3 to the aluminum plate 1 at a uniform thickness in the lengthwise direction (rolling direction) in the production process described below, and the exposed portion of the parallelly joined clad plate will become non-uniform in terms of the thickness in the lengthwise direction, resulting in a wavy external appearance and, in extreme cases, the development of cracks in thin thickness portions. As a result, the flexural separation-resistant characteristics decrease. For this reason, the lower limit of the average width of the exposed portion 4 preferably is about 0.2 mm, preferably about 0.4 mm, and the upper limit preferably is about 1.5 mm, preferably about 1.2 mm, for example. The other end portion of the nickel layer 3, as shown in FIG. 1, may be exposed on the plate surface beyond the rear end portion of the side end surface of the hard metal plate 2, or may not be exposed thereon. The hard metal plate 2 has high levels of hardness and strength in comparison with the levels of hardness and strength of the aluminum plate 1. Hence, in pressure welding, the rear end portion of the side end surface of the hard metal plate 2 and the plate surface can adequately support the downward pressing force. For this reason, the front end portion of the side end surface of the aluminum plate 1 and the nickel layer adjacent to this portion will be adequately pressure-welded to the side end surface of the hard metal plate 2, and there is no decrease in pressure weldability.

Figure 3:
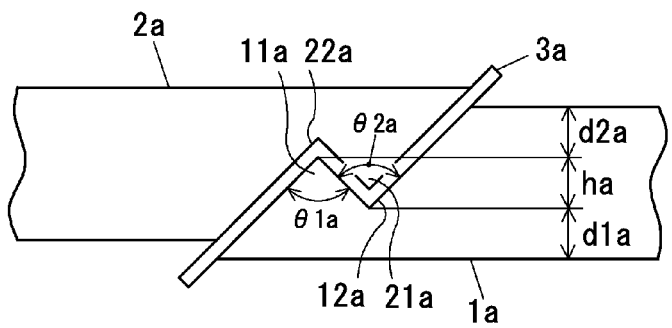
FIG. 3 is an explanatory diagram showing the overlapping condition of the materials prior to pressure welding of the parallelly joined clad plate.

The parallelly joined clad plate is produced by the production method described below. First, an aluminum base plate 1a, a hard metal base plate 2a, and a nickel sheet 3a that will be formed into an aluminum plate 1, a hard metal plate 2, and a nickel layer 3 of the parallelly joined clad plate, respectively, are prepared. As shown in FIG. 3, a ridge 11a and a groove 12a corresponding to a ridge 11 and a groove 12 in the aluminum plate 1 of the parallelly joined clad plate are formed in a side end surface of the aluminum base plate 1a. And a ridge 21a and a groove 22a corresponding to a ridge 21 and a groove 22 in the hard metal plate 2 of the parallelly joined clad plate are formed in a side end surface of the hard metal base plate 2a. The nickel sheet 3a may be a strip-shaped thin plate or creased in advance so as to follow the ridge and the groove. The aluminum base plate 1a and the hard metal base plate 2a can be readily produced by extrusion molding, press molding that forms the ridges and grooves on the side end surface of the strip-shaped thin plates, or mechanical working, for example.

Next, as shown in FIG. 3, the ridge 21a and the groove 22a of the hard metal base plate 2a are respectively superimposed on the groove 12a and the ridge 11a of the aluminum base plate 1a with the nickel sheet 3a interposed between the side end surfaces of the aluminum base plate 1a and the hard metal base plate 2a, and the resulting assembled body is pressure-welded by being passed through rolling rolls at a cold temperature (room temperature) or warm temperature. The rolling reduction ratio may be about 40% to about 80%, for example, for the thickness of the aluminum base plate 1a or the hard metal base plate 2a. In order to interpose the nickel sheet 3a between the side end surfaces in the pressure welding by rolling, the nickel sheet 3a either including a strip-shaped thin plate or being creased may be provided between the joining surfaces of the aluminum base plate 1a and the hard metal base plate 2a to be sandwiched therebetween. At this time, at least one end portion of the nickel sheet 3a is protruded from the plate surface of the aluminum base plate 1a beyond the rear end portion of the side end surface of the aluminum base plate 1a. After pressure welding with rolls, as shown in FIG. 1, produced is a pressure-welded material such that the side end surface of the aluminum plate 1 and the side end surface of the hard metal plate 2 are pressure-welded via the nickel layer 3 with the end portion of the nickel layer overlaid on the plate surface beyond the rear end portion B of the aluminum plate 1. The feed direction of the plate materials during pressure welding by rolling corresponds to the lengthwise direction of the base plates, as shown in FIG. 2.

Moreover, the pressure-welded material is diffusion-annealed to join together not only the joining surfaces of the aluminum plate 1 and the nickel layer 3 but also the joining surfaces of the nickel layer 3 and the hard metal plate 2 by diffusion joining. As a result, the aluminum plate 1 and the hard metal plate 2 are firmly joined at the respective joining surfaces. Furthermore, the nickel layer 3 overlaid on the plate surface beyond the rear end portion B of the aluminum plate 1, so that excellent flexural separation-resistant characteristics are achieved. The conditions for diffusion annealing may be an annealing temperature of about 510° C. to about 580° C. and a holding time of about 1 min to about 5 min, for example. When the nickel layer 3 is not provided, brittle intermetallic compounds tend to be produced at the joining surfaces of the aluminum plate and the hard metal plate when the annealing temperature is high, which tends to decrease joint strength. It has thus been necessary to carry out a lengthy annealing at comparatively low temperatures. In contrast, the nickel layer 3 is preferably provided in various preferred embodiments of the present invention, so that intermetallic compounds that reduce joint strength are not produced during annealing. For this reason, annealing can be carried out in a shorter time period at higher temperatures than when the nickel layer 3 is not provided, which allows an increase in productivity.

When the assembled body in which the nickel sheet 3a is provided between the aluminum base plate 1a and the hard metal base plate 2a is pressure-welded by rolling, each plate thickness of the base plates and nickel sheet is reduced under pressure, but the ratio of the distances (d1a, ha, d2a) of the ridge and groove of each base plate is not different or is not substantially different from that of the parallelly joined clad plate after pressure welding. However, the angles $\theta 1a$ and $\theta 2a$ of the ridge and groove of each of the base plates 1a and 2a become such that $\theta 1a < \theta 1$ and $\theta 2a < \theta 2$, accordingly the angles $\theta 1a$ and $\theta 2a$ of each base plate are preferably smaller than the angles $\theta 1$ and $\theta 2$ of the parallelly joined clad plate. For example, the angles $\theta 1a$ and $\theta 2a$ are preferably about 40° to about 100°. And the $\theta 1a$ and $\theta 2a$ are normally set to be equal or to be substantially equal.

Figure 4:
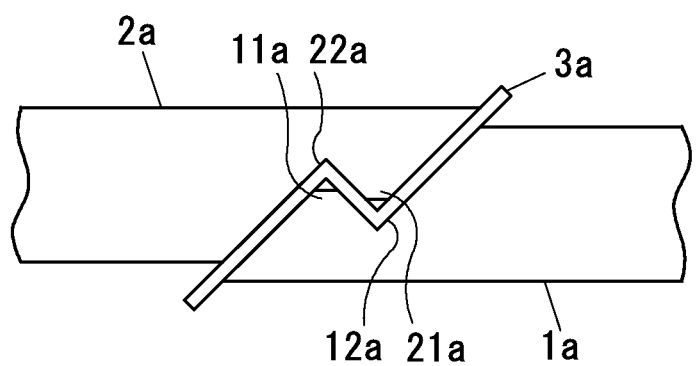
FIG. 4 is another explanatory diagram showing the overlapping condition of the materials prior to pressure welding of the parallelly joined clad plate.

FIG. 3 shows the assembled body for the production object of a parallelly joined clad plate having the configuration shown in FIG. 1. Accordingly, not only the ridge 11a and the groove 12a of the aluminum base plate 1a but also the ridge 21a and the groove 22a of the hard metal base plate 2a are preferably formed in triangular shapes in cross section, for example, but the cross-sectional shapes of the ridges and grooves are not restricted to such shapes. For example, as shown in FIG. 4, the triangular ridges 11a, 21a to be engaged to the triangular grooves 22a, 12a may have their peak portions that are formed with a flat shape. Forming the peak portion of the ridge with a flat shape facilitates engagement with the groove. Moreover, the cross-sectional shapes of the ridges and grooves may be trapezoidal with peak portions of the ridges and the bottom portions of the grooves including flat surfaces.

The parallelly joined clad plate of the preferred embodiments of the present invention is described in detail below by providing examples, but the preferred embodiments of the present invention are not to be interpreted as being restricted by these examples.

EXAMPLES

Aluminum base plates and hard metal base plates each in a strip shape and each having a thickness of 3 mm and rectangular cross-sectional shape were prepared. As shown in FIG. 3, a ridge 11a and a groove 12a having triangular cross-sections were formed in the side end surfaces of each aluminum base plate, and a ridge 21a and a groove 22a having the same cross-sectional shapes were formed in the side end surface of each hard metal base plate. The dimensions were $\theta 1a = \theta 2a = 90°$ and $d1a = d2a = ha = 1$ mm. And strip-shaped nickel sheets having a thickness of 0.25 mm made of pure Ni were also prepared.

The aluminum base plate, nickel sheet and hard metal base plate were superimposed on each other as shown in FIG. 3 and were subjected to cold pressure-welding by being passed through a pair of upper and lower rolls at room temperature to produce a pressure-welded material having a thickness of 1 mm. At the time of pressure welding, the insertion position of each nickel sheet was adjusted so that, after pressure welding, each exposed portion 4 (refer to FIG. 1) of the nickel layer overlaid on the plate surface beyond the rear end portion of the side end portion of the aluminum plate was formed to have various widths. Each pressure-welded material was annealed for 3 min at 550° C. to produce a sample of a parallelly joined clad plate having the cross-sectional shape shown in FIG. 1. In each sample of the parallelly joined clad plate according to a preferred embodiment of the present invention, the angles θ1 and θ2 were both about 145°, the thicknesses d1, d2 and h were approximately equal, and the average thickness of the nickel layer was about 100 μm. And each average width in the lengthwise direction of the width W of the exposed portion 4 of the nickel layer is presented in Table 1. For purposes of comparison, samples of a parallelly joined clad plate without the nickel layer and a simple aluminum plate without a nickel layer and hard metal plate were also prepared. The simple aluminum plate was prepared by pressing a pure Al plate to reduce its thickness from 3 mm to 1 mm and then annealing for 3 min at 550° C.

Figure 5:
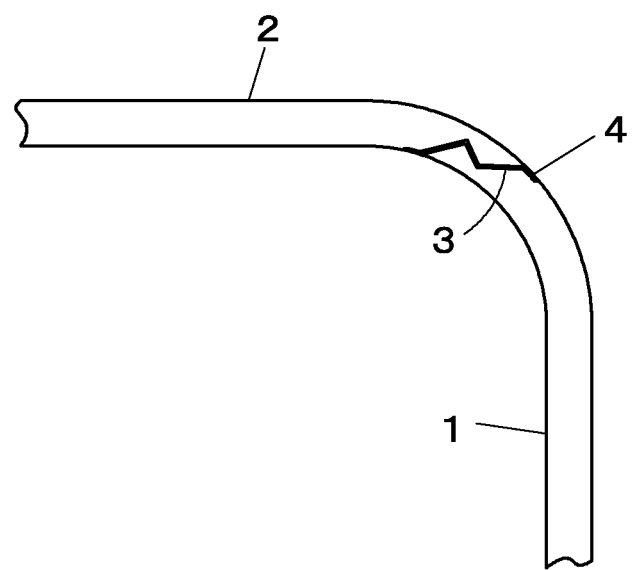
FIG. 5 is an explanatory diagram showing a tendency for the bending test for the parallelly joined clad plate in an example.

The external appearance of the exposed portion 4 of the nickel layer exposed on the plate surface of the aluminum plate of each resulting parallelly joined clad plate was visually observed in order to check for the presence of cracking. In addition, as shown in FIG. 2, a tensile test strip TP having a width of 10 mm was taken from each sample in the width direction, i.e., the transverse direction of the plate, and a tensile test was carried out at a tensile speed of 1 mm/min until the test piece broke in order to investigate the tensile strength and the break location. Moreover, a bend test strip having the same width just like the tensile test strip was take from each sample, and as shown in FIG. 5, the test strip was bent at an angle 90° and a bending radius (inner radius) of 2 mm with the exposed portion 4 of the nickel layer on the surface of the aluminum plate 1 placed at a central location on the outside of the bend. And then the front end portion in the side end surface of the hard metal plate 2 was visually observed for the presence of peeling. The results are compiled in Table 1 in which "Parent metal" under Break location means that breaking occurred in a portion of the aluminum plate that did not include the joined surfaces, and "Interface" means that breaking occurred along the joining interface (rear-side slanted surface of the groove 12) of the aluminum plate.

From Table 1, it is seen that the parallelly joined clad plates of sample Nos. 3 to 6, 8, and 9 (these hard metal plates made of pure Cu or Cu alloy) and sample Nos. 12, 13, and 15 (these hard metal plates made of pure Fe or mild steel) in which the average width of each exposed portion 4 of the nickel layer was 0.2 mm to 1.5 mm each had a superior joint strength and broke in the aluminum plate outside the joined surface in the tensile test. And the front end portions of the hard metal plates of those samples did not peel in the 90° bend test. On the other hand, sample No. 1 that did not have a nickel layer, samples (sample Nos. 2, 11) that had nickel layers but did not have exposed portions, and samples (sample nos. 7, 14) in which the exposed portions were formed but the average widths were too great each had a decreased joint strength and broke along with peeling at the joining interface. And the front end portions of the hard metal plates of those samples peeled off from the rear end portions of the aluminum plates together with the nickel layers.

TABLE 1

| | Parallelly jointed clad plate Structure & material | | | Exposed portion of nickel layer | | Tensile test | | 90° bend | |
|---|---|---|---|---|---|---|---|---|---|
| Sample No. | Aluminum plate | Nickel layer | Hard metal plate | Average width (mm) | Cracking | Strength (N/mm²) | Break location | test Peeling | Remarks |
| 1 | Pure Al | (Absent) | Pure Cu | — | — | 21 | Interface | Present | Comparative example |
| 2 | Pure Al | Pure Ni | Pure Cu | 0.0 | Absent | 64 | Interface | Present | Comparative example |
| 3 | Pure Al | Pure Ni | Pure Cu | 0.2 | Absent | 91 | Parent metal | Absent | Example |
| 4 | Pure Al | Pure Ni | Pure Cu | 0.5 | Absent | 93 | Parent metal | Absent | Example |
| 5 | Pure Al | Pure Ni | Pure Cu | 1.0 | Absent | 88 | Parent metal | Absent | Example |
| 6 | Pure Al | Pure Ni | Pure Cu | 1.5 | Absent | 84 | Parent metal | Absent | Example |
| 7 | Pure Al | Pure Ni | Pure Cu | 2.0 | Present | 70 | Interface | Present | Comparative example |
| 8 | Pure Al | Pure Ni | Cu—30%Zn | 1.0 | Absent | 87 | Parent metal | Absent | Example |
| 9 | Pure Al | Pure Ni | Cu—6%Ni | 1.0 | Absent | 89 | Parent metal | Absent | Example |
| 11 | Pure Al | Pure Ni | Pure Fe | 0.0 | — | 61 | Interface | Present | Comparative example |
| 12 | Pure Al | Pure Ni | Pure Fe | 0.2 | Absent | 94 | Parent metal | Absent | Example |
| 13 | Pure Al | Pure Ni | Pure Fe | 1.0 | Absent | 92 | Parent metal | Absent | Example |
| 14 | Pure Al | Pure Ni | Pure Fe | 2.0 | Present | 72 | Interface | Present | Comparative example |
| 15 | Pure Al | Pure Ni | Mild steel (Fe—0.2%C) | 1.0 | Absent | 90 | Parent metal | Absent | Example |
| 21 | Pure Al | (Absent) | (Absent) | — | — | 96 | — | — | Comparative example |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A clad plate comprising:
an aluminum plate made of an aluminum material;
a nickel layer; and
a hard metal plate made of a copper material; wherein
a side end surface of the aluminum plate, the nickel layer, and a side end surface of the hard metal plate are joined together in this sequence by a pressure weld;
the aluminum plate includes a ridge and a groove extending from a front end side to a rear end side in the side end surface thereof and the hard metal plate includes a groove and a ridge extending from a rear end side to a front end side in the side end surface thereof, with the ridge and groove of the aluminum plate being respectively engaged and jointed, via the nickel layer, to the groove and ridge of the hard metal plate; and
the nickel layer includes an end portion that is jointed to a surface of the aluminum plate, the end portion of the nickel layer extending beyond the rear end portion of the side end surface of the aluminum plate and being exposed on the surface thereof, and an average width of the end portion of the nickel layer exposed on the surface of the aluminum plate being in a range from about 0.2 mm to about 1.5 mm.

2. A clad plate comprising:
an aluminum plate made of an aluminum material;
a nickel layer; and
a hard metal plate made of an iron material; wherein
a side end surface of the aluminum plate, the nickel layer, and a side end surface of the hard metal plate are joined together in this sequence by a pressure weld;
the aluminum plate includes a ridge and a groove extending from a front end side to a rear end side in the side end surface thereof and the hard metal plate includes a groove and a ridge extending from a rear end side to a front end side in the side end surface thereof, with the ridge and groove of the aluminum plate being respectively engaged and jointed, via the nickel layer, to the groove and ridge of the hard metal plate; and
the nickel layer includes an end portion that is jointed to a surface of the aluminum plate, the end portion of the nickel layer extending beyond the rear end portion of the side end surface of the aluminum plate and being exposed on the surface thereof, and an average width of the end portion of the nickel layer exposed on the surface of the aluminum plate being in a range from about 0.2 mm to about 1.5 mm.

3. The clad plate according to claim 1, wherein the side end surface of the aluminum plate, the nickel layer, and the side end surface of the hard metal plate are joined together in this sequence by the pressure weld and diffusion portions therebetween.

4. The clad plate according to claim 1, wherein the aluminum material is pure aluminum or an aluminum alloy having an electrical conductivity of about 10% IACS or greater, and the copper material is pure copper or a copper alloy having an electrical conductivity of about 10% IACS or greater.

5. The clad plate according to claim 2, wherein the side end surface of the aluminum plate, the nickel layer, and the side end surface of the hard metal plate are joined together in this sequence by the pressure weld and diffusion portions therebetween.

6. The clad plate according to claim 2, wherein the aluminum material is pure aluminum or an aluminum alloy having an electrical conductivity of about 10% IACS or greater, and the iron material is pure iron or mild steel.

7. The clad plate according to claim 3, wherein each plate thickness of the aluminum plate and the hard metal plate is in a range from about 0.5 mm to about 2 mm.

8. The clad plate according to claim 7, wherein an average thickness of the nickel layer is in a range from about 30 μm to about 120 μm.

9. The clad plate according to claim 4, wherein each plate thickness of the aluminum plate and the hard metal plate is in a range from about 0.5 mm to about 2 mm.

10. The clad plate according to claim 5, wherein each plate thickness of the aluminum plate and the hard metal plate is in a range from about 0.5 mm to about 2 mm.

11. The clad late according to claim 6, wherein each plate thickness of the aluminum plate and the hard metal plate is in a range from about 0.5 mm to about 2 mm.

12. The clad plate according to claim 9, wherein an average thickness of the nickel layer is in a range from about 30 μm to about 120 μm.

13. The clad plate according to claim 10, wherein an average thickness of the nickel layer is in a range from about 30 μm to about 120 μm.

14. The clad plate according to claim 11, wherein an average thickness of the nickel layer is in a range from about 30 μm to about 120 μm.

* * * * *